United States Patent [19]
Heller et al.

[11] 3,737,145
[45] June 5, 1973

[54] FABRICATED VALVE BALL

[75] Inventors: Kenneth G. Heller, Redwood City; Harold T. Ray, Oakland; Douglas A. Martens, Concord, all of Calif.

[73] Assignee: Walworth Company, Bala Cynwyd, Pa.

[22] Filed: Aug. 2, 1971

[21] Appl. No.: 168,079

[52] U.S. Cl...................................251/309, 251/367
[51] Int. Cl.................................................F16k 5/02
[58] Field of Search......................251/309, 315, 366, 251/367

[56] References Cited
UNITED STATES PATENTS

| 3,484,079 | 12/1969 | Reagan | 251/309 |
| 3,246,873 | 4/1966 | Johnson | 251/315 X |
| 3,339,259 | 9/1967 | Johnson | 251/315 X |
| 3,367,359 | 2/1968 | Johnson | 251/315 X |
| 3,463,450 | 8/1969 | Works | 251/309 |
| 3,518,742 | 7/1970 | Merrill et al | 251/315 X |
| 3,545,721 | 12/1970 | Shafer | 251/309 |
| 3,603,560 | 9/1971 | Merrill et al | 251/309 |

*Primary Examiner*—Samuel Scott
*Attorney*—Melvin R. Stidham

[57] ABSTRACT

A fabricated valve ball comprising a pair of hemispherical shell members and an inner, rigid annular reinforcing beam, with the circular edges of the shell members disposed around it and spaced axially from each other. A thick weldment deposited around the reinforcing beam unifies it with the circular edges. The shell members are truncated at diametrically opposite sides by annular cuts extending axially into the beam, whereby diametrically opposed portions thereof protrude as trunnion cores. Cylindrical caps are welded to the trunnion cores to function as trunnions which are integral with the annular beam.

4 Claims, 10 Drawing Figures

INVENTORS
KENNETH G. HELLER
HAROLD T. RAY
BY DOUGLAS A. MARTENS
ATTORNEY

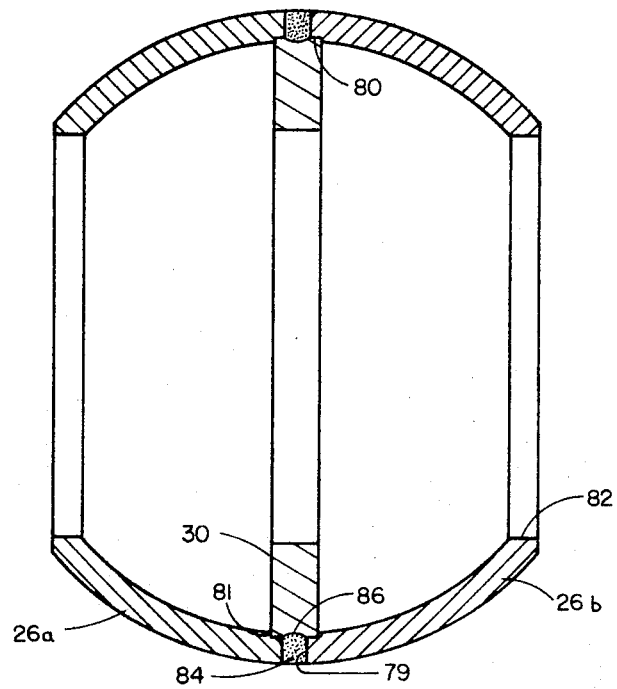
FIG-3-
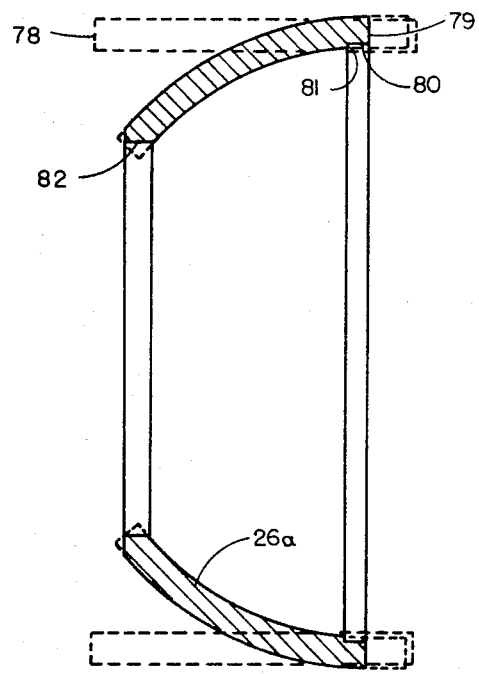
FIG-2-

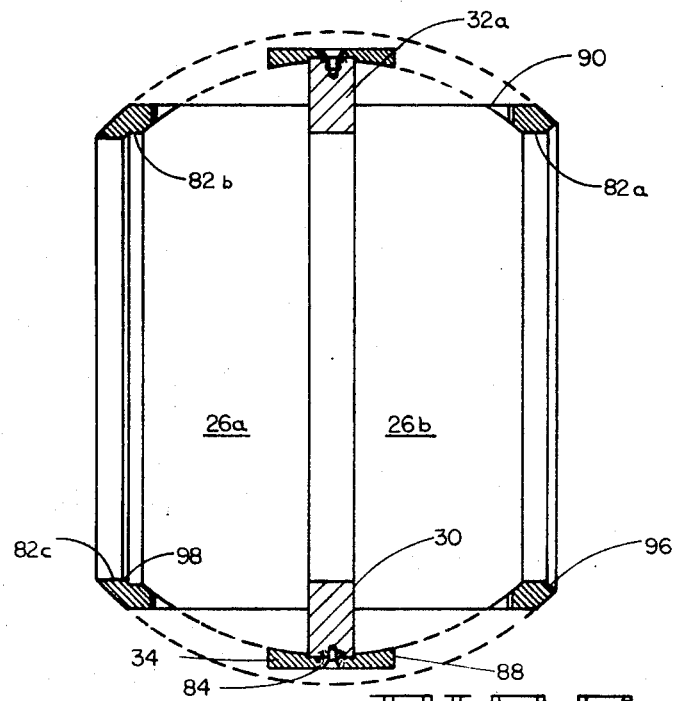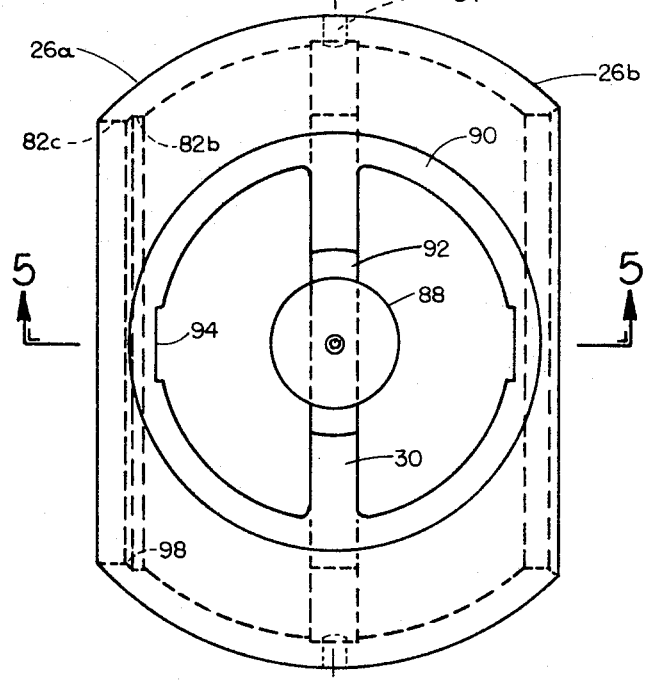

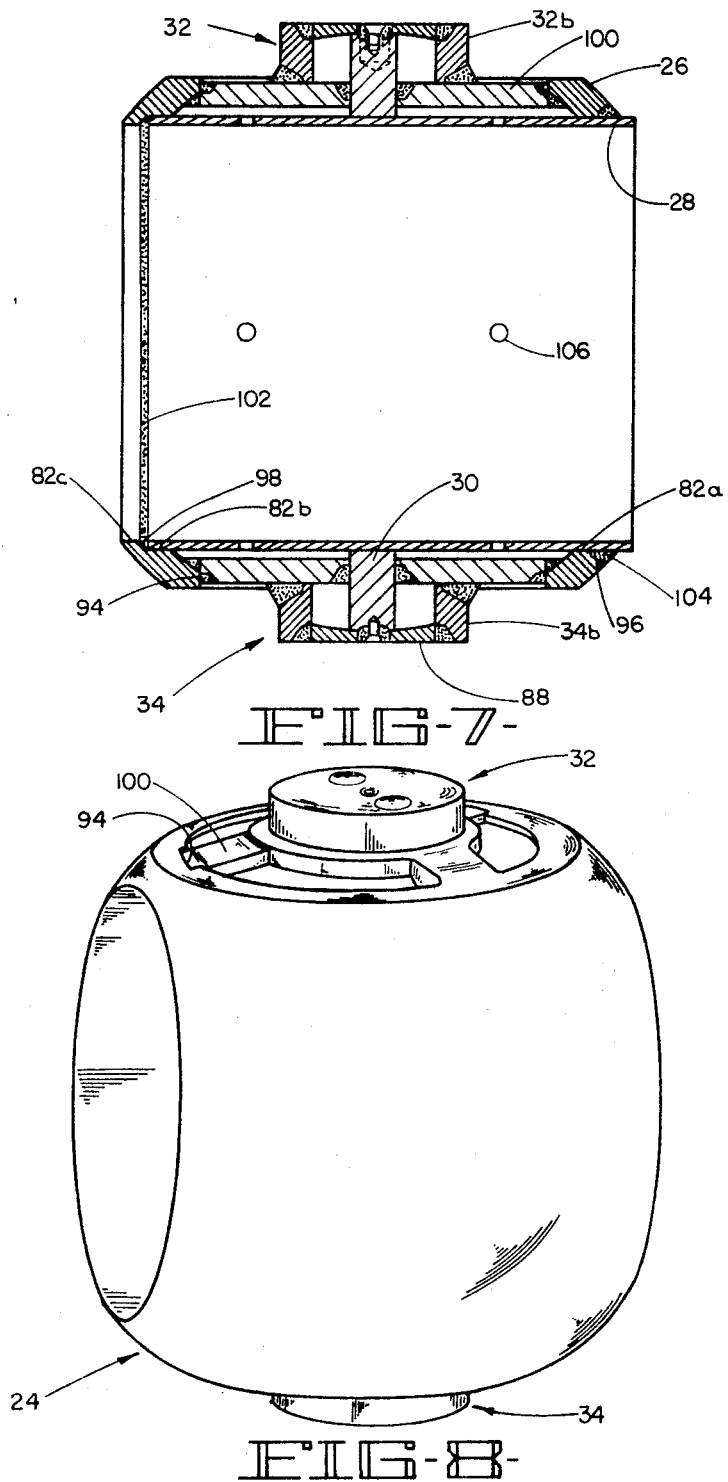

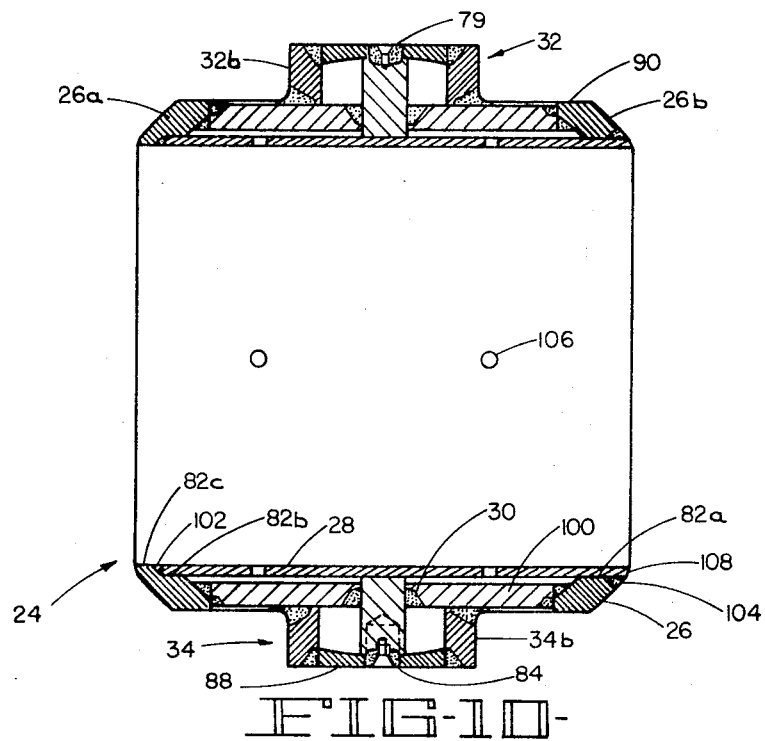
FIG-10-
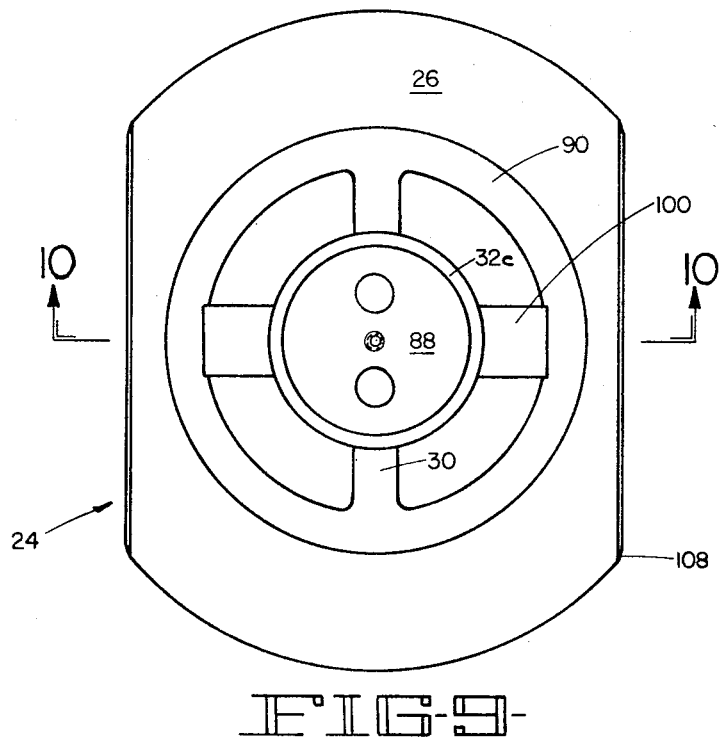
FIG-9-

FABRICATED VALVE BALL

BACKGROUND OF THE INVENTION

This invention relates to a valve ball and, more particularly, to a fabricated valve ball of large diameter for high pressure pipeline operation.

Fabricated spherical valve plugs or balls have obvious inherent advantages over solid cast or forged metal balls by reason of their greatly reduced weight. This may result in a substantial saving in material costs, particularly if the ball may be fabricated from rolled steel shapes. In addition, the relatively light ball may be turned without the torque requirement of heavy cast or forged valve balls, and does not require that support components, such as bearings, operators and the like, be as heavy or rugged.

However, fabricated balls for valves have not seen wide utility, particularly in high pressure operation. If the valve ball is fabricated from thin material, it tends to collapse or be deformed out of its spherical configuration under high pressures. If, on the other hand, heavy materials are employed, the difficulty of forming them into spherical configurations results in excessive manufacturing costs.

OBJECTS OF THE INVENTION

It is an object of this invention to provide a fabricated valve ball which is relatively light in weight, but effectively resistant to deformation under pressure.

It is a further object of this invention to provide a fabricated valve ball with means for transferring fluid pressure loads, which are asserted against the spherical flow blocking surface, to the bearing supports.

Other objects and advantages of this invention will become apparent from the description to follow when read in conjunction with the accompanying drawings.

BRIEF SUMMARY OF THE INVENTION

In carrying out this invention, there is provided a spherical shell formed essentially of two generally hemispherical components which are disposed around a central, annular reinforcing beam. A slag weld of substantial thickness is deposited around the beam with the annular edges of the hemispherical components functioning as a continuous mold for the molten weld material. The spherical shell so formed is truncated at diametrically opposite ends by an annular cut at each end around a central protruding portion of the annular beam, which portions function as cores for trunnion caps which are subsequently welded thereto. The openings in the hemispherical components and the central, annular beam are all finished internally to the same diameter and a cylindrical liner sleeve is placed within the shell and welded around its opposite circular ends to the shell openings, thereby forming a unitary structure therewith.

DESCRIPTION OF THE DRAWINGS

FIG. 2 is a section view of a shell component from which the valve ball is fabricated;

FIG. 3 is a spherical shell at a preliminary stage of fabrication;

FIG. 4 is a top view of the spherical shell at an intermediate stage of fabrication;

FIG. 5 is a section view taken along line 5—5 of FIG. 4;

FIG. 7 is a vertical section view of a valve ball prior to final finishing;

FIG. 8 is an isometric view of a fabricated ball after final machining;

FIG. 9 is a top view of the ball of FIG. 8; and

FIG. 10 is a section view taken along line 10—10 of FIG. 9.

DESCRIPTION OF A PREFERRED EMBODIMENT

Figure 1:
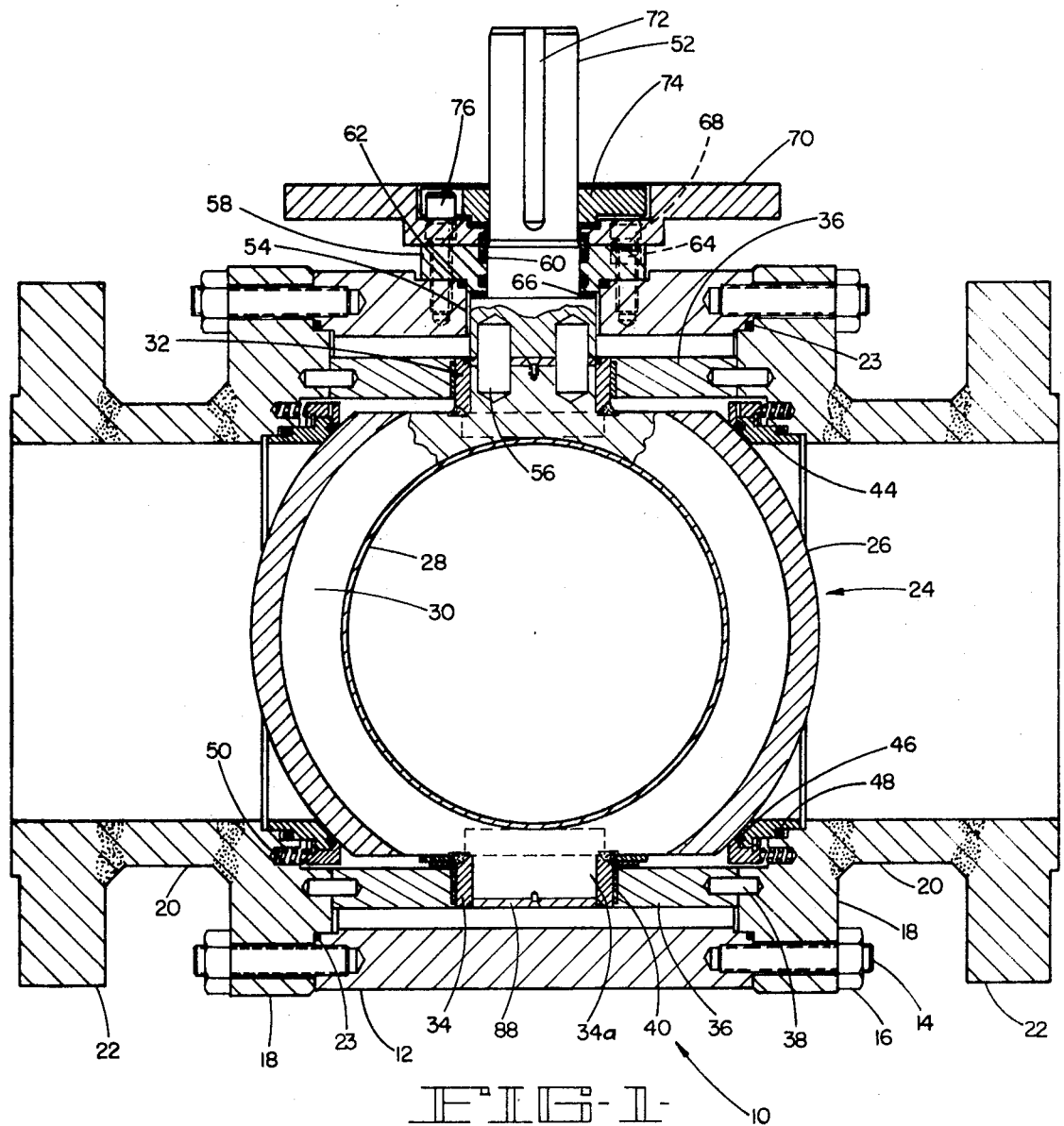
FIG. 1 is a vertical section view of a ball valve embodying features of this invention.

Referring now more particularly to FIG. 1, there is shown a ball valve 10 which may, for example, include a tubular body band 12 rolled from plate material. Secured to the end faces of the body band 12, as by means of studs 14 and nuts 16, are end closures 18 to which may be welded hubs 20 terminating in suitable means such as flange plates 22 for connecting the valve 10 into a pipeline (not shown). Suitable seals, such as O-rings 23 seal between the end closures and the tubular body band 12.

The valve ball 24 of this invention comprises a spherical shell 26, a cylindrical liner sleeve 28 and an annular reinforcing rib or beam 30, interconnecting the upper and lower trunnions 32 and 34. The trunnions are rotatably carried in upper and lower bearing blocks 36 which are positioned in the body of engagement of dowel pins 38 in the end closures 18 and secured in place by being clamped between the end closures 18 when the nuts 16 are tightened. Suitable bushings 40 are provided in the bearing blocks 36 and a thrust bearing is carried on the lower bearing block, all to facilitate rotation of the ball 24.

The main valve seals may comprise seat rings 44 in each of which is carried a main seal ring 46 to seal against the ball 24, and a tail seal 48 to seal against the body closure 18. Both seals 46 and 48 may be of the O-ring type. Compression springs 50 carried in recesses around the end closures bias the seat rings 44 toward engagement with the valve ball.

In assembly, a seat ring assembly may be mounted in one end closure 18 and the closure may then be secured to the body band 12. The valve ball 24 with bearing blocks 36 carried on trunnions 32 and 34 is inserted through the opposite body opening and, after being positioned, the opposite end closure with seat ring assembly in place is bolted into place. Then, the valve stem 52 is inserted through an opening 54 in the top of the tubular body band 12 with dowel pins 56 protruding therefrom engaging in complementary holes bored in the upper trunnion 32 to transmit rotary movement thereto. A gland plate 58 carrying inner O-rings 60 to seal around the stem and a larger O-ring 62 to seal between the gland plate and the body band is bolted at 64 to the body band to seal around the stem and retain it in place. Thrust washers 66 are provided to facilitate rotation. Finally, secured to the gland plate by suitable means 68 is a mounting plate 70 adapted to receive a power operator (not shown) which may rotate the stem by engagement with the key way 72. A stop plate 74, also carried on the stem, engages a cap screw head 76 to define the 90° open and closed limits of rotation.

A significant feature of this invention is the fabrication of a valve ball from metal shapes. Referring first to FIGS. 2 and 3, a cylindrical tube 78 is swaged as in a press (not shown) into a truncated hemispherical form 26a with a reduced diameter circular opening therein. After being so formed, the larger annular end 79 is machined and an annular cylindrical surface 80 is cut around the inner surface, forming a shoulder 81. In addition, the smaller circular opening is machined to a cylindrical inner surface 82.

After be so machined, the hemispherical sections 26a and 26b are seated on the annular strength rib or beam 30 of substantial cross section with the outer surface of the rib engaging the machined cylindrical surfaces 80 and the shoulders 81 engaging opposite sides of the annular rib. As so assembled, the annular faces 79 of the hemispherical shell are in spaced relationship so that a slag weld 84 of substantial thickness is deposited on the rib and between the spaced annular surfaces 79 of the hemispherical components. Hence, during fabrication, the rib 30 and the annular faces 79 function as a continuous mold for the deposition of a substantial quantity of molten weld metal. Preferably, the rib has a groove 86 machined around it for greater penetration of the weld and a more complete union of the two hemispherical shell components 26a and 26b and the strength rib 30.

Figure 6:
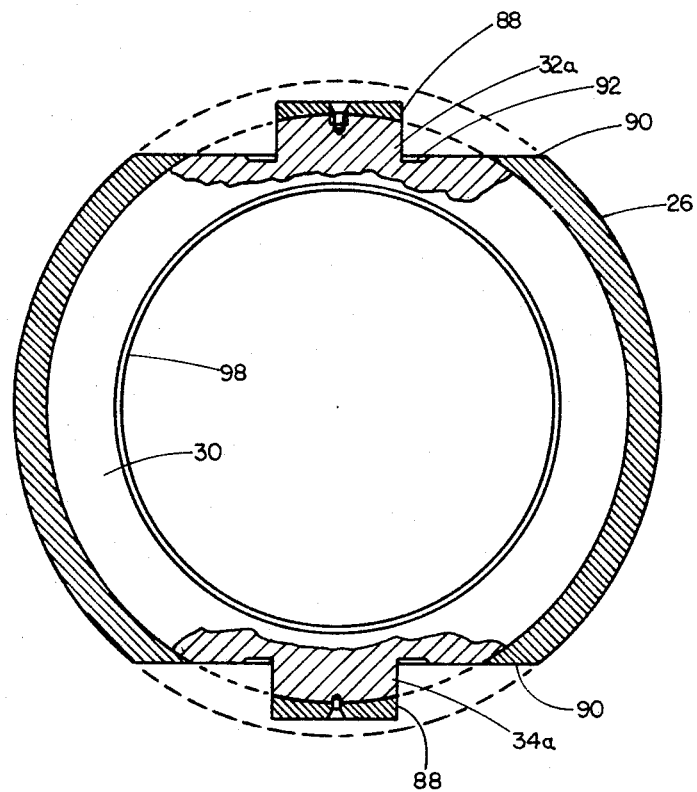
FIG. 6 is a section view taken along line 6—6 of FIG. 4.

Referring now to FIGS. 4, 5 and 6, the sphere so formed is cut away at opposite ends, as by burning in annular pattern, to leave opposing circular portions 88 of the shell, and those portions 32a and 34a of the annular rib 30 which are contained within the areas of such circular portions 88. Around such protruding portions, the opposite ends of the sphere and the strength rib 30 are truncated to a flat surface 90. A portion 92 of the rib 30, which surrounds the circular member 88 is cut slightly deeper to receive a trunnion cap. As shown most clearly in FIG. 6, there is formed an annular beam or rib 30 with diametrically opposed integral trunnion cores 32a and 34a. In addition, lateral recesses 94 are cut out to receive trunnion reinforcing ribs, as will hereinafter be described.

After the sphere is so truncated, the interior is machined so that one circular opening 82a, the reinforcing annular rib 30 and a portion 82b of the other circular opening are all finished to the same diameter. A taper 96 is cut at the larger opening and a tapered shoulder 98 is cut between the surface 82b and the smaller diameter surface 82c, both for purposes to be described.

Referring now to FIG. 7, transverse trunnion reinforcing ribs 100 are welded between the annular strength rib 30 and the recesses 94, which were cut in the shell 26, in order to further strengthen the structure. Then, cylindrical caps 32b and 34b are welded to these reinforcing ribs 100, to the annular strength rib 30, and to the circular portion 88 of the shell to form the opposing trunnions 32 and 34. The cylindrical liner 28 is inserted through the larger opening at the right in FIG. 7 to engage with the tapered shoulder 98 at the left. A weld 102 is deposited around and between the end of the sleeve 28 and the tapered shoulder and another weld 104 is deposited around the sleeve at the tapered opening 96 at the other end. A number of holes 106 are provided around the liner sleeve 28 to equalize pressure inside and outside thereof. Finally, referring to FIGS. 8, 9 and 10, the surfaces of the sphere 26 and the trunnions 32 and 34 are machined to their final dimensions, and the liner sleeve 28 and the weld 104 are machined at 108 to merge with the surrounding spherical surface 26.

As so fabricated, the valve ball 24 is a rigid structure formed essentially of two hemispherical components 26a, 26b and a rigid annular beam 30 disposed coaxially with the inner cylindrical liner 28, with all three components being unified by deposition of substantial weld material 84 around the periphery of the annular beam and between annular faces 79 of the hemispherical components. The annular beam is an integral part of the opposed trunnions whereby in the closed position of the ball 24, as shown in FIG. 1, loads which are asserted against the ball by line pressure against the spherical surface 26, are transmitted directly to the trunnions 32 and 34 and thence to the valve body 12 to which they are distributed. The spherical shell 24 is further strengthened by the lateral trunnion support ribs 100 and by the cylindrical liner 28 welded around its annular edges to the openings 82a, 82b in the spherical shell 26. The result is a relatively lightweight valve ball with considerable strength and rigidity.

While this invention has been described in conjunction with a preferred embodiment thereof, it is apparent that modifications and changes therein may be made by those skilled in the art without departing from the spirit and scope of this invention as defined by the claims appended hereto.

What is claimed is:

1. A fabricated valve ball for relatively high pressure service comprising:
    a generally spherical relatively thick shell with opposing, generally circular openings,
    said shell being formed by a pair of generally hemispherical shell components,
    an internal shoulder in each of said shell components adjacent the annular edges thereof,
    said internal shoulders engaging the sides of said annular reinforcing beam with said annular edges spaced apart whereby the outer surface of said beam and said annular edges form an annular mold receptacle,
    a weldment on and around said beam substantially filling said receptacle to unite said annular edges and said beam,
    a pair of opposing trunnion members on said shell with the axis thereof normal to the axis of said circular openings,
    a massive annular rigid reinforcing beam welded in said shell coaxial with said circular openings and interconnecting said trunnion members,
    a cylindrical liner welded at its ends around said circular openings, and
    at least one pressure equalizing opening through said liner.

2. The fabricated valve ball defined by claim 1 wherein:
    said shell is truncated at opposing sides and portions of said beam protrude beyond the truncated portions as integral parts of said trunnion members.

3. The fabricated valve ball defined by claim 2 including:
    trunnion support beams welded transversely to said reinforcing beam and to said shell across said truncated portions.

4. The fabricated ball defined by claim 2 wherein:
    said trunnion members are formed by cylindrical caps welded to said protruding portions of the reinforcing beam.

* * * * *